Sept. 18, 1951  W. H. ROY  2,568,367
SAFETY GUARD FOR POWER PRESSES
Filed Sept. 12, 1949  2 Sheets-Sheet 1

INVENTOR.
WALDRON H. ROY
BY
ATTORNEY

Sept. 18, 1951     W. H. ROY     2,568,367
SAFETY GUARD FOR POWER PRESSES
Filed Sept. 12, 1949     2 Sheets-Sheet 2

INVENTOR.
WALDRON H. ROY
BY
ATTORNEY

Patented Sept. 18, 1951

2,568,367

UNITED STATES PATENT OFFICE 2,568,367

SAFETY GUARD FOR POWER PRESSES

Waldron H. Roy, Oxford, Conn., assignor to William M. Goss, Jr., Waterbury, Conn.

Application September 12, 1949, Serial No. 115,205

1 Claim. (Cl. 74—613)

This invention relates to safety guards, and more particularly to a guard for protecting an operator's hands against injury in presses, spot-welders, riveters, and other machines having reciprocating parts which are potentially dangerous to the operator.

One object of this invention is to provide a guard of the above nature in which the operator's hands will be removed from the danger zone at the proper time by a pair of sweep rods which have a positive operating connection with the reciprocating machine parts, whereby the operator will be protected during every cycle of the machine, whether said cycle is intentional on the part of the operator or otherwise.

Another object is to provide a safety guard of the above nature in which the sweep rods will be actuated by relatively short cam-operated levers, whereby a small intial movement of the machine parts will cause the sweep rods to remove the operator's hands from the danger zone.

Another object is to provide a safety guard of the above nature which is readily adjustable in accordance with different presses and to different operating conditions, and which will hold its adjustment against accidental changes.

A further object is to provide a safety guard of the above nature which will be simple in construction, inexpensive to manufacture, easy to install, compact, ornamental in appearance, very dependable in operation, and efficient and durable in use.

With these and other objects in view, there has been illustrated on the accompanying drawings one form in which the invention may conveniently be embodied in practice.

Figure 1:
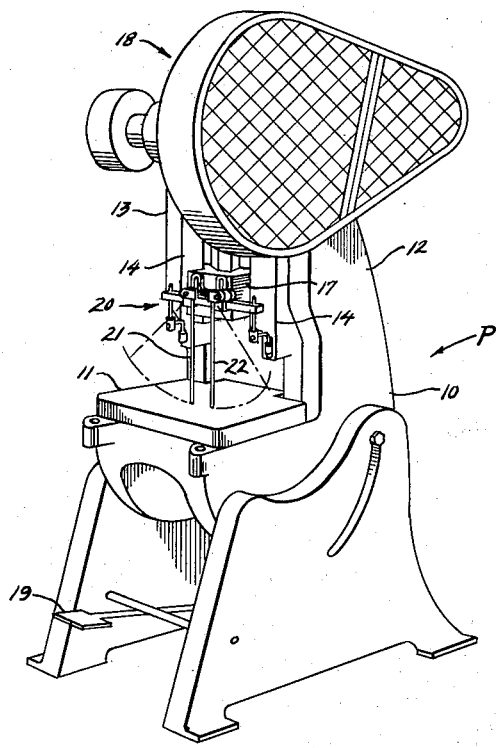
Fig. 1 is a perspective view showing the improved safety guard as it would appear when applied to one type of press.
Figure 2:
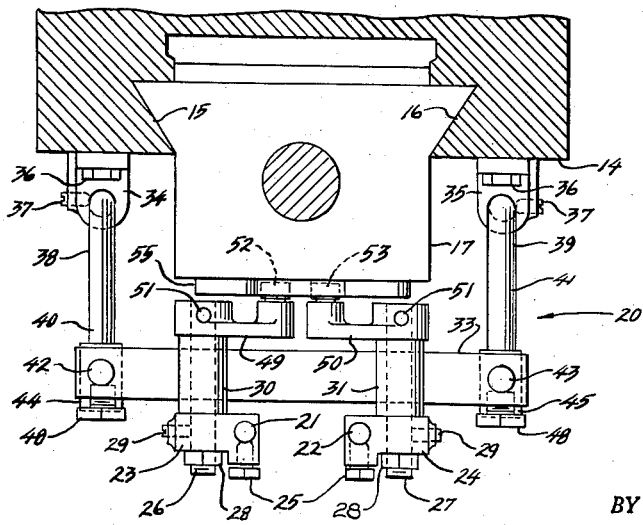
Fig. 2 is a plan view of the safety guard on an enlarged scale, showing adjacent portions of the press.
Figure 3:
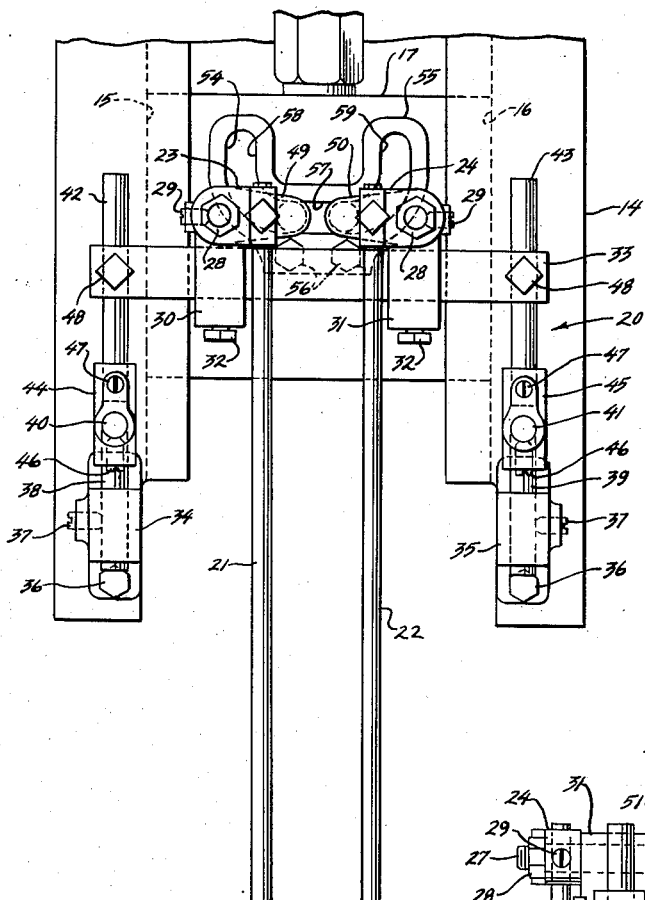
Fig. 3 is a front view of the same.
Figure 4:
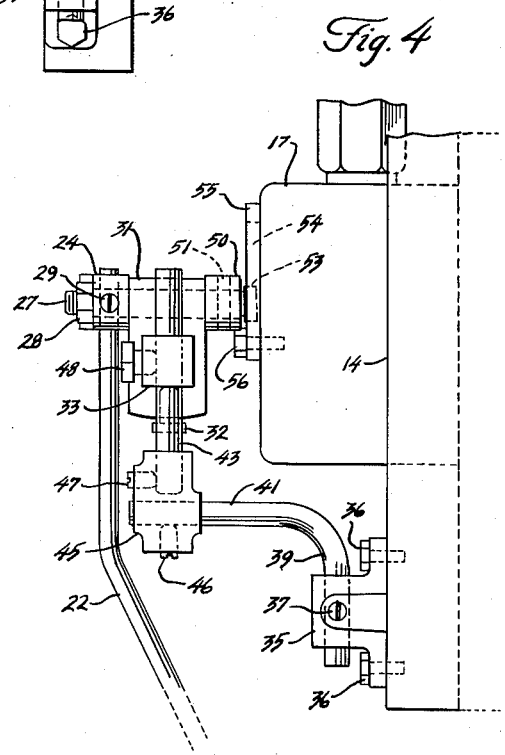
Fig. 4 is a side view of the same, the lower portions of the sweep rods being broken away.

Referring now to the drawings in which like reference characters denote corresponding parts throughout the several views, the letter P indicates a press of the type which has a frame 10 provided with a bolster plate 11 and a pair of side pillars 12, 13, which embrace a subframe 14. The subframe 14 is provided with a pair of parallel vertical ways 15, 16, which slidably retain a dovetailed press gate 17 adapted to be vertically reciprocated in said ways by means of operating mechanism 18 when the latter is actuated by means of a pedal 19.

The improved safety guard is indicated generally by the numeral 20, and comprises a pair of depending laterally-swingable sweep rods 21, 22, the upper end portions of which are secured in a pair of angular blocks 23, 24, respectively, by means of set screws 25.

The angular blocks 23, 24 are retained upon threaded outer end portions of a pair of parallel horizontal shafts 26, 27 by means of a pair of nuts 28, and are held against rotation with relation to said shafts by means of set screws 29.

The shafts 26, 27 are rotatably carried in apertured bearing blocks 30, 31 respectively having set screws 32 for securing said bearing blocks in laterally adjusted positions upon a square horizontal supporting bar 33 embraced by the lower portions of said blocks.

In order to mount the supporting bar 33 in a stationary position which is forwardly of the gate 17 when the latter is at the upper end of its stroke, provision is made of means preferably comprising a pair of apertured brackets 34, 35 adapted to be attached to front side portions of the subframe 14 by means of screws 36, said brackets having set screws 37 for adjustably securing a pair of upwardly and forwardly extending L-rods 38, 39 in said brackets.

The respective L-rods 38, 39 have forwardly-projecting upper end portions 40, 41 to which a pair of vertical rods or uprights 42, 43 are adjustably attached by means of angular apertured couplings 44, 45 having pairs of set screws 46, 47 for securing said L-rods and said vertical rods respectively.

Opposite end portions of the horizontal supporting bar 33 are vertically apertured and provided with horizontal set screws 48 so as to provide vertically adjustable attachment of said bar to the vertical rods 42, 43. Thus, it will be seen that the vertical rods 42, 43 and the L-rods 38 are constructed and arranged to permit both horizontal and vertical adjustment of the supporting bar 33, as will be further described hereinafter. However, it will be understood that other suitable bracket structures may be employed for mounting the supporting bar 33 upon the press P.

In order to operate the sweep rods 21, 22, the inner ends of the horizontal shafts 26, 27 have laterally inwardly extending levers 49, 50, secured thereto by means of cross pins 51, the effective length of said levers being relatively short as compared with the length of the sweep rods 21, 22. The ends of the levers 49, 50 are provided with rearwardly-extending followers or cam rollers 52, 53 engaged in a U-shaped slot 54 in a vertical cam plate 55 which is secured to the front face of the gate 17 by means of screws 56.

It will be seen that the U-shaped slot 54 has a horizontal lower portion 57 in which the cam rollers 52, 53 are disposed when the gate 17 is in its uppermost position and the sweep rods 21, 22 are in adjacent or lowermost central positions.

The respective ends of the horizontal slot portion 57 are curved upwardly and extend into steeply inclined or vertical end slot portions 58, 59 which the cam rollers 52, 53 will enter when the gate 17 descends to a lower position, with attendant outward swinging and separating of the sweep rods 21, 22.

It will thus be seen that an initial downward movement of the gate 17 will cause the sweep rods 21, 22 to be swung rapidly in an outward direction as a result of the horizontal formation of the lower slot portion 57 and the relative shortness of the cam levers 49, 50, and it will also be seen that the subsequent further downward movement of the gate 17 will merely cause the sweep rods 21, 22 to be held stationary or nearly stationary in their outer positions as a result of the vertical formation of the slot end portions 58, 59.

Figure 5:
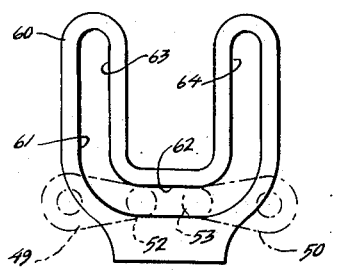
Fig. 5 is a front view of a modified cam plate which may be used for operating the sweep rods.

The cam plate 55 may, of course, be modified so as to permit the safety guard 20 to be used upon presses having different lengths of stroke, or to cause the sweep rods 21, 22 to swing outwardly during a relatively smaller initial portion of the downward movement of the gate 17, one such modified cam plate being shown at 60 in Fig. 5.

The cam plate 60 is of generally the same construction as the cam plate 55 and is provided with a U-shaped slot 61 having a horizontal lower portion 62.

The slot 61, however, is provided with relatively long vertically extended end portions 63, 64, so as to accommodate the cam rollers 52, 53 during a relatively long downward stroke of the gate 17, and also providing for complete outward swinging movement of the sweep rods 21, 22 during a relatively small initial portion of the downward stroke of said gate.

*Installation*

In installing the improved safety guard 20 upon a punch press P, it will merely be necessary to drill and tap suitable holes to receive the screws 36 and 56 in the subframe 14 and in the gate 17, respectively, no further alteration of said press being required. The cam plate 55 will then be secured in place by means of the screws 56 and the brackets 34, 35 will be attached to the subframe 14 by means of the screws 36, so as to hold the cam rollers 52, 53 in operating position within the cam slot 54.

Inasmuch as the L-rods 38, 39 are horizontally swingable for purposes of adjustment, the utility of the safety guard 20 will not be limited by any specific width of the subframe 14, said L-rods 38, 39 being secured by the set screws 37 in such positions as to center the horizontal supporting bar 33 opposite the raised position of the gate 17. The angular couplings 44, 45 will be suitably adjusted inwardly or outwardly upon the L-rods 38, 39 so as to locate the cam rollers 52, 53 in a proper vertical plane for effective operating relationship to the cam plate 55, said couplings 44, 45 being secured by means of the set screws 46.

Vertical adjustment of the supporting bar 43 will, of course, be permitted by loosening the set screws 48, said adjustment being such that the short operating levers 49, 50, occupy horizontal positions when the gate 17 is in its uppermost position.

It will be understood that when the operating levers 49, 50 are horizontal, the sweep rods 21, 22 will be disposed in adjacent positions which may be vertical as shown. However, if it is desired that the sweep rods 21, 22 be disposed eccentrically at one side of the center of the press when they are in their adjacent positions (as for example to permit the operator to have better access to the press) the sweep rods 21, 22 may both be adjusted in the same lateral direction after first loosening the set screws 29 and the nuts 28. It will also be understood that operation of the press will cause the sweep rods 21, 22 to swing across the front of the press, regardless of the location in which said sweep rods may be disposed when in their neutral or adjacent positions.

Vertical adjustment of the sweep rods 21, 22 will be permitted by the set screws 25, and will be such that the lower ends of the sweep rods will be disposed adjacent the bolster plate 11 when said rods are in their lowermost or vertical positions.

The speed and range of movement of the sweep rods 21, 22 may be adjusted by moving the bearing blocks 30, 31 inwardly or outwardly upon the supporting bar 33, the set screws 32 serving to hold said bearing blocks in their adjusted positions. The effect of adjusting the bearing blocks 30, 31 toward each other will be to increase the speed and range of movement of the sweep rods 21, 22, while outward adjustment of said bearing blocks will decrease the speed and range of movement of said sweep rods.

The reason for this effect will be apparent when it is considered that the cam rollers 52, 53 are actuated only by the horizontal slot portion 57 and the immediately adjacent curved slot portions.

*Operation*

In operation, the operator may have free access to the press at either side of the sweep rods 21, 22. When the press is put into operation, the gate 17 will start to descend and the sweep rods 21, 22 will immediately swing outwardly so as to remove the operator's hands from the danger zone beneath the gate 17.

In practice, it has been found that the safety guard may be so adjusted that the sweep rods 21, 22 will swing apart to approximately their fullest extent after only ⅝" initial downward movement of the gate 17. Further downward movement of the gate 17 will cause little or no further outward movement of the sweep rods 21, 22, inasmuch as the cam rollers 52, 53 will then be disposed in the vertical slot portions 58, 59.

When the gate 17 returns to its upper position, the sweep rods 21, 22 will swing toward each other to their relatively adjacent or neutral positions so that the operator may again have free access to the press.

It will be noted that the sweep rods 21, 22 have a positive operating connection with the gate 17, so that the safety guard will always operate when the press operates, and the operator cannot be caught unawares by accidental repeating of the press cycle.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claim.

Having thus fully described the invention, what is claimed as new, and for which is is desired to secure Letters Patent, is:

In a safety guard for a machine having a reciprocating member, a pair of laterally swingable sweep rods, means for mounting said sweep rods in depending positions in front of the path of said reciprocating member, a pair of cam levers operatively connected to said sweep rods for swinging the respective rods, and a cam plate adapted to be attached to said reciprocating member and having a slot operatively engaged with said cam levers, said slot having a portion disposed at right angles to the path of said reciprocating member for swinging said cam levers, and a pair of additional slot portions which are disposed at angles to said first mentioned slot portion for holding said cam levers during continued movement of said reciprocating member.

WALDRON H. ROY.

REFERENCES CITED

The following references are of record in the file of this patent:

UNITED STATES PATENTS

| Number | Name | Date |
|---|---|---|
| 2,289,901 | Burkhardt | July 14, 1942 |
| 2,407,527 | Anstedt | Sept. 10, 1946 |

FOREIGN PATENTS

| Number | Country | Date |
|---|---|---|
| 220,453 | Great Britain | Aug. 21, 1924 |